United States Patent Office 3,816,604
Patented June 11, 1974

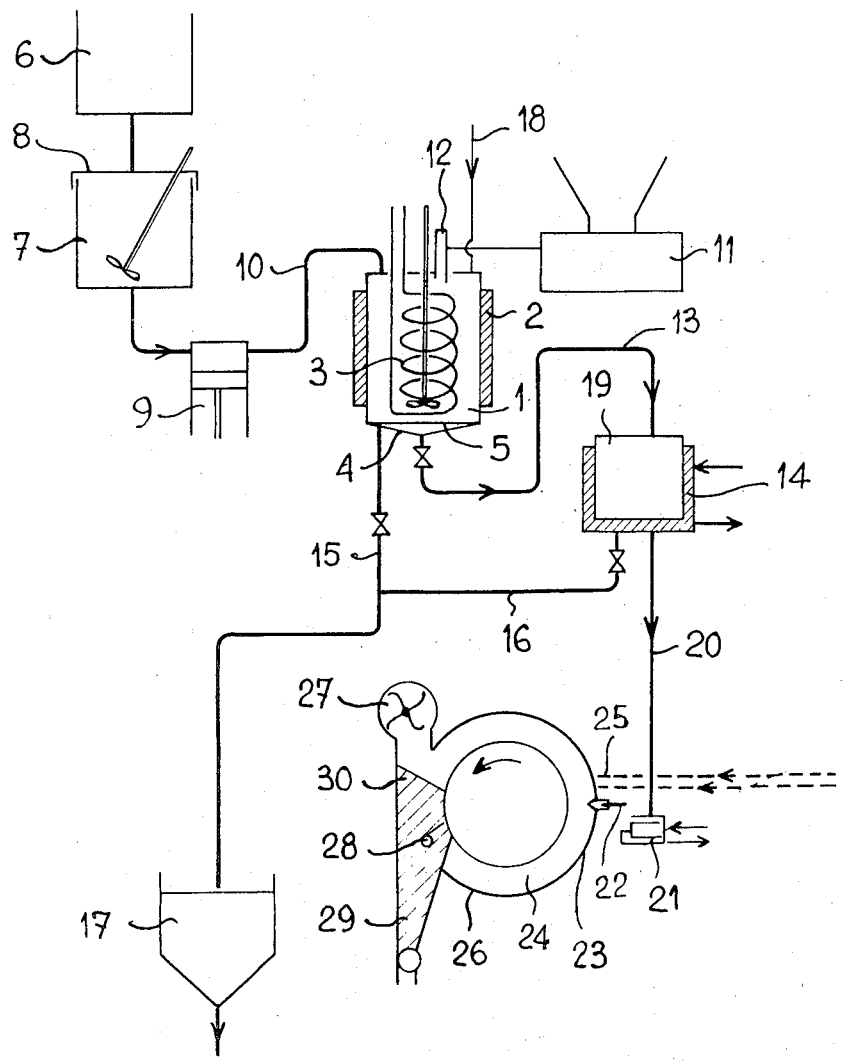

3,816,604
PROCESS FOR THE PREPARATION OF ALKALINE HYPEROXIDE
Jean Malafosse, Lyon, France, assignor to L'Air Liquide, Societe Anonyme pour L'Etude et L'Exploitation des Procedes Georges Claude, Paris, France
Filed July 3, 1972, Ser. No. 268,835
Claims priority, application France, Mar. 17, 1972, 7209323
Int. Cl. C01b $13/10$; C01d $11/00$
U.S. Cl. 423—581          8 Claims

ABSTRACT OF THE DISCLOSURE

Alkaline hyperoxides (superoxides) are prepared by forming.

A concentrated aqueous solution of alkaline hydroxide and hydrogen peroxide itself continuously prepared by adding the two reagents to a preformed mixture thereof, such that the alkaline hydroxide and hydrogen peroxide at a titer at least equal to 85% are maintained at molar ratio $1.5 \leqslant H_2O_2/MOH \leqslant 1.75$ and the temperature of the solution is $<10°$ C.; and then alkaline hyperoxide is prepared from the said solution by continuous, punctual, rapid dehydration.

The resultant pulverulent compositions are particularly suitable for pelleting.

---

The present invention relates to the preparation of alkaline hyperoxides (superoxides) and more particularly to the preparation of potassium hyperoxide suitable for direct pelleting.

The principle involved in the preparation of potassium hyperoxide, the formula of which is $KO_2$, from hydrogen peroxide and potassium hydroxide is well known. According to the work of Karzarnovkii and Nieding, "Doklady. Akad. Naud," U.S.S.R., 86,717 (1952), $H_2O_2$ with KOH yields a potassium dihydroperoxidate peroxide according to:

(a) 
$$2KOH + 3H_2O_2 \rightarrow K_2O_2 \cdot 2H_2O_2 + 2H_2O$$

Disproportionation of potassium dihydroperoxidate peroxide, without special precautions, results in the following reaction:

(d) 
$$K_2O_2 \cdot 2H_2O_2 \rightarrow 2KO_2 + 4(KOH \cdot H_2O) + 3O_2$$

but this disproportionation equation is the overall result of two reactions; the first, corresponding to the formation of potassium hyperoxide according to:

(b) 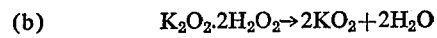
$$K_2O_2 \cdot 2H_2O_2 \rightarrow 2KO_2 + 2H_2O$$

is followed by the reaction of water on the potassium hyperoxide formed in accordance with (c) 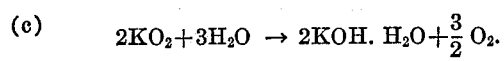
$$2KO_2 + 3H_2O \rightarrow 2KOH \cdot H_2O + \frac{3}{2}O_2.$$

Furthermore, in an atmosphere containing carbon dioxide, there is a reaction of $CO_2$ on potassium hyperoxide:

(e) 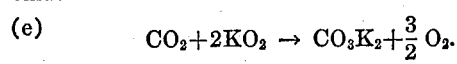
$$CO_2 + 2KO_2 \rightarrow CO_3K_2 + \frac{3}{2}O_2.$$

The Soviet authors mentioned above employ reaction (b) and effect dehydration by utilising the conventional laboratory means, i.e. a sulphuric or phosphoric *in vacuo* desiccator at ambient temperature.

U.S. Pat. No. 3,120,997 merely repeats the technique previously described without supplying a technological solution which would permit industrial exploitation of the process. Furthermore, the technique described in this specification is of a "delicate" nature and the results indicated are difficult to reproduce.

The main difficulties experienced in the preparation of potassium hyperoxide from potassium hydroxide are first of all due to the highly exothermic nature of the addition of hydrogen peroxide to potassium hydroxide, the result thereof being considerable evolution and a considerable loss of oxygen. On the other hand, the action of water on hyperoxide makes it necessary to effect the potassium dihydroperoxidate peroxide disproportionation reaction in apparatus permitting the separation as rapidly as possible of potassium hyperoxide from reaction or dilution water. A third difficulty is due to the action of carbon dioxide which makes it necessary to effect all the operations in a decarbonated atmosphere.

In French Pat. No. 1,460,714 of Sept. 29, 1965, there is disclosed a process wherein reaction (a) is effected by the introduction in calculated fashion of hydrogen peroxide in the dispersed state into an organic medium which is inert relative to the reagents concerned and which does not dissolve them; the aqueous phase is separated and then alkaline hyperoxide is prepared therefrom by pulverisation and rapid drying. This process can be applied only with difficulty to industrial manufacture, since it involves three heterogeneous phases and is thus limited to discontinuous operations; furthermore, despite all the precautions taken, solvent losses are inevitable, and this makes the operation more costly. On the other hand, despite the employment of pure potash and alcohol, the stability of the solution obtained is low and is not sufficient to warrant industrial exploitation.

For the carrying out reaction (b), there has been disclosed an apparatus of the scaler-drier type wherein the external wall of the cylinder is zirconium, porcelain, glass or polytetrafluoroethylene. In fact, the non-metallic materials are not compatible with industrial utilisation of this type and zirconium is a costly rare metal the metallurgy of which is difficult and which has the disadvantage that it is soft, its hardness diminishing very considerably even under the action of the functioning temperature.

According to the invention, there has been found a process permitting the pallation of the disadvantages encountered in the known proceses and the preparation of an alkaline hyperoxide, in particular potassium hyperoxide, in pulverulent form such as is directly suitable for pelleting or pastille-preparation.

The present process, wherein hydrogen peroxide is reacted with an alkaline hydroxide in an aqueous medium, is characterised in that (1) a concentrated aqueous solution of alkaline hydroxide and hydrogen peroxide is continuously prepared by adding the two reagents to a preformed mixture thereof, (2) the continuous addition of alkaline hydroxide and hydrogen peroxide at a titer at least equal to 85% and at rates such that the molar ratio $H_2O_2/MOH$ is between approximately 1.5 and 1.75 (M designating an alkaline metal) and the temperature of the solution is lower than 10° C., is effected; and (3) then alkaline hyperoxide is prepared from the said solution by continuous, punctual, rapid dehydration.

According to an object of the invention, the preformed mixture of the reagents is prepared by the addition of solid alkaline hydroxide to a relatively diluted hydrogen peroxide, the concentration of which is between 50 and 80%, until the molar ratio $H_2O_2/MOH$ is lower than 1.5, then there is added hydrogen peroxide the concentration of which is higher than 90%, preferably between 94 and 98%, until the molar ratio $H_2O_2/MOH$ is comprised between 1.5 and 1.75, the temperature of the preformed mixture being maintained below 10° C.

The preparation of the preformed mixture (so-called sediment or heel according to the process of the invention permits the preparation of a stable mixture and prevents any crystallisation at the temperature under consideration.

On the heel thus produced, there may be effected the continuous addition of solid potash and hydrogen peroxide the titer of which is higher than 85%, at rates so selected that the molar ratio $H_2O/KOH=R$ remains between 1.5 and 1.75 and the heat exchange capacity of the mixing aparatus permits maintaining the temperature of the solution between 0 and 5° C., drawing-off of the solution obtained being effected continuously at the base of the apparatus permits maintaining the temperature of the solu- of a constant liquid level.

The process of the invention is compatible with the utilisation of inexpensive and readily available raw material, such as flake potash of the so-called low iron-content type, which may contain up to 10 p.p.m. of $Fe^{++}$ and/or $Fe^{+++}$ cations.

It has been found that it is possible to obtain a $K_2O_2$, $2H_2O_2$ concentrated aqueous solution which is stable for several days at a temperature lower than 10° C., preferably between 0 and 5° C., by employing as reagent hydrogen peroxide the content of which is at least equal to 85% and in which the $Mg^{++}$ cation is incorporated in the form, for example, of heptahydrated sulphate, preferably at a concentration between 10 g. and 50 g. of $MgSO_4 7H_2O$ per litre of hydrogen peroxide; this concentration of $MgSO_4 \cdot 7H_2O$ corresponds to 1.65 to 8.25 g. of $Mg^{++}$ per liter of $H_2O_2$.

It is advantageous to maintain a temperature ranging between 0 and 5° C. during the various phases of the process, i.e. preparation of the preformed mixture, preparation of the concentrated $K_2O_2 \cdot 2H_2O$ aqueous solution, and storage thereof.

It has been found that the carrying into effect of reaction (b) for disproportionation or dehydration of the solution $K_2O_2 \cdot 2H_2O$ by continuous rapid, punctual drying is effected in a particularly advantageous manner with the aid of a scaling or flaking drier the cylinder of which is externally covered with a layer of electrolytic nickel. Such disporportionation is effected at a temperature ranging between 100 and 400° C., and preferably between 140 and 180° C.

On the other hand, it has been found that it is unnecessary to employ a perfectly inert and dry atmosphere for the carrying into effect of the phases of the process as a whole. An atmosphere constituted by air at least partially freed from carbon dioxide is suitable for the satisfactory carrying into effect of the process.

The process of the invention makes it possible to prepare on an industrial scale a powder the grain size and apparent density of which are suitable for a pelleting or pastille-forming operation. The product thus prepared is particularly suitable for the preparation of cartridges for lifesaving respiratory apparatus.

An example of the mode of carrying into effect and of apparatus is given hereinbelow by way of non-limitative example.

EXAMPLE a—Continuous preparation of the aqueous concentrated solution of potash and hydrogen peroxide Into a reactor 1 consisting of a stainless steel cylinder having a double envelope 2, a cooling coil 3, a bottom 4 made from polyvinyl chloride and provided with a grid 5 manufactured from the same material, there is introduced hydrogen peroxide the titer of which is higher than 85% and which contains $MgSO_4 7H_2O$, the delivery rate being 16.5 g. per litre. The hydrogen peroxide is first of all stored in the receptacle 6 before being introduced into the receptacle 7 where it receives, via the duct 8, the appropriate quantity of heptahydrated magnesium sulphate; it is then supplied to the reactor 1 by the pump 9 and the piping 10. Simultaneously, there is supplied, with the aid of the solid distributor 11 and the pipe 12, solid industrial potash in flake form at 85–88% KOH and which may contain up to 10 p.p.m. of iron ions. These two reagents are continuously introduced into the reactor, already filled with the $KOH-H_2O_2$ mixture—see, hereinbelow, the initial filling; the contents of the reactor are agitated by the aparatus 12 at two levels, in such manner that the solid potash particles dropping to the surface of the liquid are immediately dispersed. It is the purpose of the grid 5 to prevent the emergence from the reactor of large particles of potash which have not completely reacted.

The solution is taken-off through the conduit 13 disposed in such manner as to maintain in the apparatus a constant level just reaching the coil 3; the said solution is stored in the receptable 14. The reactor 1 and the receptacle 14 are provided with a safety device permitting rapid emptying of the solution which they contain when the temperature exceeds a predetermined value indicative of the commencement of decomposition, via tubes 15 and 16 to a receptable 17 containing water, this receptacle being emptied to the exterior. If the empyting operation is triggered, the receptacles 1 and 14 receive water through the pipes or tubes 18 and 19.

The yields by weight of 85% $H_2O_2$ and 85–88% KOH are equal and are such that the temperature ranges between 0 and 5° C. The apparatus 1, 11, 14 are swept by air freed from $CO_2$.

b—Initial filling of the reactor

This operation is effected once per manufacturing operation by adding to the reactor 1 containing hydrogen peroxide diluted to approximately 70% by weight, solid potash at a rate such that the temperature does not exceed 10° C. and in a quantity such that the final KOH content of the mixture is outside the range of concentrations such as are normally utilised and higher than the matter, i.e. up to a ratio $R=\text{mol } H_2O_2/\text{mol } KOH<1.5$. Then, suitable proportions are recovered by adjusting the active oxygen titer of the solution by means of 98% hydrogen peroxide ($1.5<R<1.75$).

c—Preparation of the hyperoxide

The solution contained in receptable 14 is transferred via tube 20 into receptacle 21 which is maintained at a temperature ranging between 0 and 5° C. Dipping into the receptable 21 are one or more tubes 22 made of polytetrafluoroethylene serving for the feeding with liquid of atomisers 23 functioning by suction. These apparatus of the "flat jet" type, project the solution in fine droplets against a rotating cylinder 24 externally covered with a layer of nickel deposited by electrolytic means. Above the row of atomisation jets, there is supplied via the pipe 25 a flow of decarbonated air heated to 180–200° C. The cylinder is heated by internal steam circulation in such manner that its surface temperature, before any atomisation takes place, is 160° C. The cylinder is disposed in a cylindrical compartment 26 provided with a device for the aspiration of moist air 27. The potassium hyperoxide forming on the cylinder is detached therefrom by scraping with the aid of a steel blade 28 and extracted from the apparatus by passage through a funnel 29; the baffle 30 separates, in the apparatus, the moist reaction zone from the dry hyperoxide extraction zone.

Employing this type of apparatus, comprising an 8 l. reactor 1, there is prepared at a rate of 3 kg./h. a composition solution the active oxygen titer of which is 19.5% and the molar ratio $H_2O_2/KOH=1.65$. After atomisation with a liquid flow rate of 3 kg./h. and a hot gas flow rate of 40 m.³/h., there is obtained a pulverulent product at the rate of 1350 g./h., this being a yellow product containing 80 to 85% of $KO_2$ and having an apparent density, after light crushing, of 0.45 g./cm.³. This powder may be converted directly to pellets or pastilles without adjuvant of any kind and with the aid of conventional apparatus; only slight pressure is necessary for such agglomeration.

What I claim is:

1. An improved process for the preparation of alkaline hyperoxide, wherein hydrogen peroxide is reacted in an aqueous medium with an alkaline metal hydroxide, and wherein there is continuously prepared a concentrated aqueous solution of alkaline hydroxide and hydrogen peroxide, adding the two reagents to a preformed mixture thereof, then there is effected the continuous addition of alkaline hydroxide and hydrogen peroxide of titer at least equal to 85% and at flow rates such that the molar ratio $H_2O_2/MOH$ is maintained between approximately 1.5 and 1.75 and stabilized with 1.65 to 8.25 g. of $Mg^{++}$ per liter of $M_2O_2$ and the temperature of the solution is 0 to 10° C., and then alkaline hyperoxide is prepared from the said solution by continuous and rapid dehydration.

2. An improved process according to claim 1, wherein the preformed mixture is prepared by addition of solid alkaline hydroxide to relatively diluted hydrogen peroxide the concentration of which is between 50 and 80%, until the molar ratio $H_2O_2/MOH<1.5$, and then hydrogen peroxide of concentration higher than 90% is added until the molar ratio $H_2O_2/MOH$ is between 1.5 and 1.75, the temperature of the preformed mixture being maintained lower than 10° C.

3. A process according to claim 1, wherein the hydrogen peroxide of concentration at least equal to 85% contains the $Mg^{++}$ ion in the form of 10 to 50 g. of heptahydrated sulphate per liter of $H_2O_2$.

4. A process according to claim 1, wherein the temperature of the preformed mixture of alkaline hydroxide and hydrogen peroxide is between 0 and 5° C.

5. A process according to claim 1, wherein the alkaline hydroxide is potassium hydroxide, optionally in the form of flakes, the titer thereof being 88–90% of KOH and which may contain up to 10 p.p.m. of $Fe^{++}$ and/or $Fe^{+++}$ cations.

6. A process according to claim 1, wherein dehydration is effected at a temperature of 100 to 400° C.

7. A process according to claim 6, wherein dehydration is effected at a temperature of 140 to 180° C.

8. A process according to claim 1, the various operations are effected under decarbonated air.

References Cited

UNITED STATES PATENTS

| 2,908,552 | 10/1959 | Cunningham et al. | 423—582 |
| 3,321,277 | 5/1967 | Bach | 423—641 |

OSCAR R. VERTIZ, Primary Examiner

B. E. HEARN, Assistant Examiner

U.S. Cl. X.R.

423—641